Oct. 12, 1965

C. J. KINSEY 3,211,171

MILKING SYSTEM

Filed Feb. 28, 1963

INVENTOR.
CLIFFORD J. KINSEY
BY
Andrus & Starke
ATTORNEYS

Oct. 12, 1965     C. J. KINSEY     3,211,171
MILKING SYSTEM
Filed Feb. 28, 1963     2 Sheets-Sheet 2

INVENTOR.
CLIFFORD J. KINSEY
BY
Andrus & Starke
ATTORNEYS

United States Patent Office 3,211,171
Patented Oct. 12, 1965

3,211,171
MILKING SYSTEM
Clifford J. Kinsey, Delavan, Wis., assignor to Sta-Rite Products, Inc., Delavan, Wis., a corporation of Wisconsin
Filed Feb. 28, 1963, Ser. No. 261,769
9 Claims. (Cl. 137—394)

This invention relates to a milking system and more particularly to an apparatus for preventing milk from entering the vacuum supply line.

In the conventional pipeline milking system the milk is drawn by vacuum from the pipeline into a receiving jar having an outlet which is connected to a pump. The pump is operably connected to a milk level sensing mechanism in the receiving jar so that when the level of milk in the receiving jar reaches an upper level the pump is actuated to pump the milk out of the jar. When the milk has fallen to a minimum level the pump is shut off.

A milk trap is usually associated with the milk receiving jar and serves as a safety device to close the vacuum line in the event milk floods over into the milk trap from the receiving jar because excessive air is injected into the milk line or due to failure of the milk pump. The conventional milk trap utilizes a float actuated valve in which a valve in the vacuum line is closed when the milk rises in the milk trap to a given level. However, in some cases the milk enters the trap with great force causing the float to bounce or to be temporarily submerged. This results in droplets of milk being drawn beyond the shutoff valve in the vacuum line before the float recovers its position and closes off the valve. Small quantities of milk drawn into the vacuum line may accumulate in the vacuum pump and eventually affect the operation of the vacuum pump.

The present invention is directed to an improved mechanism for shutting off the vacuum line at a substantial distance from the float in the milk trap so that no milk will be drawn through the vacuum line to the vacuum pump. More specifically, the vacuum line, which is connected to the source of vacuum, is provided with a valve which is operably connected to a pressure responsive member, such as a diaphragm. One surface of the diaphragm is disposed to the atmosphere while the opposite surface is exposed to the source of vacuum so that the valve is normally in the open position. The opposite surface of the diaphragm may also be exposed to the atmosphere through a conduit which is controlled by a float operated valve located in the milk trap.

Normally, the valve located in the vacuum line is in the open position. However, when milk floods over into the milk trap from the receiving jar, the float will rise and will open the float valve in the air bleed line, thereby admitting air to the diaphragm chamber to flex the diaphragm and close off the valve in the vacuum line. The air bleed conduit leading into the diaphragm chamber has a substantially larger cross sectional area than the vacuum line leading to the diaphragm chamber so that the air being bled into the diaphragm chamber will be of greater volume than that which can be removed by the vacuum source.

This construction provides a simple and effective shut-off device for the vacuum line which is located at a remote location from the float so that the milk will not be drawn into the vacuum line in the event the float is temporarily submerged or bounces due to the force of the milk entering the milk trap.

The vacuum shutoff mechanism of the invention is also useful during the washing cycle for the pipeline milking system. During the washing cycle, the washing liquid is caused to overflow from the receiving jar into the milk trap in order to wash the connections between the jar and the trap as well as the trap itself. In the conventional milk trap construction, the float in the trap will rise causing the valve carried by the float rod to seat with the result that the vacuum line would be closed off and no automatic means would exist to unseat the valve so that the washing cycle could continue. With the present invention, the float will rise as the wash water enters the milk trap to shut off the vacuum line and thereby prevent the washing solution from entering the vacuum pump. However, as the milk pump carries away the washing solution from the receiving jar, it also lowers the liquid level in the milk trap by virtue of a milk trap drain hose which is connected into the drain of the receiving jar. This permits the float to lower and causes the vacuum line to open again, restarting the cycle.

Other objects and advantages will appear in the course of the following description.

The drawings illustrate the best mode contemplated of carrying out the invention.

Figure 1:
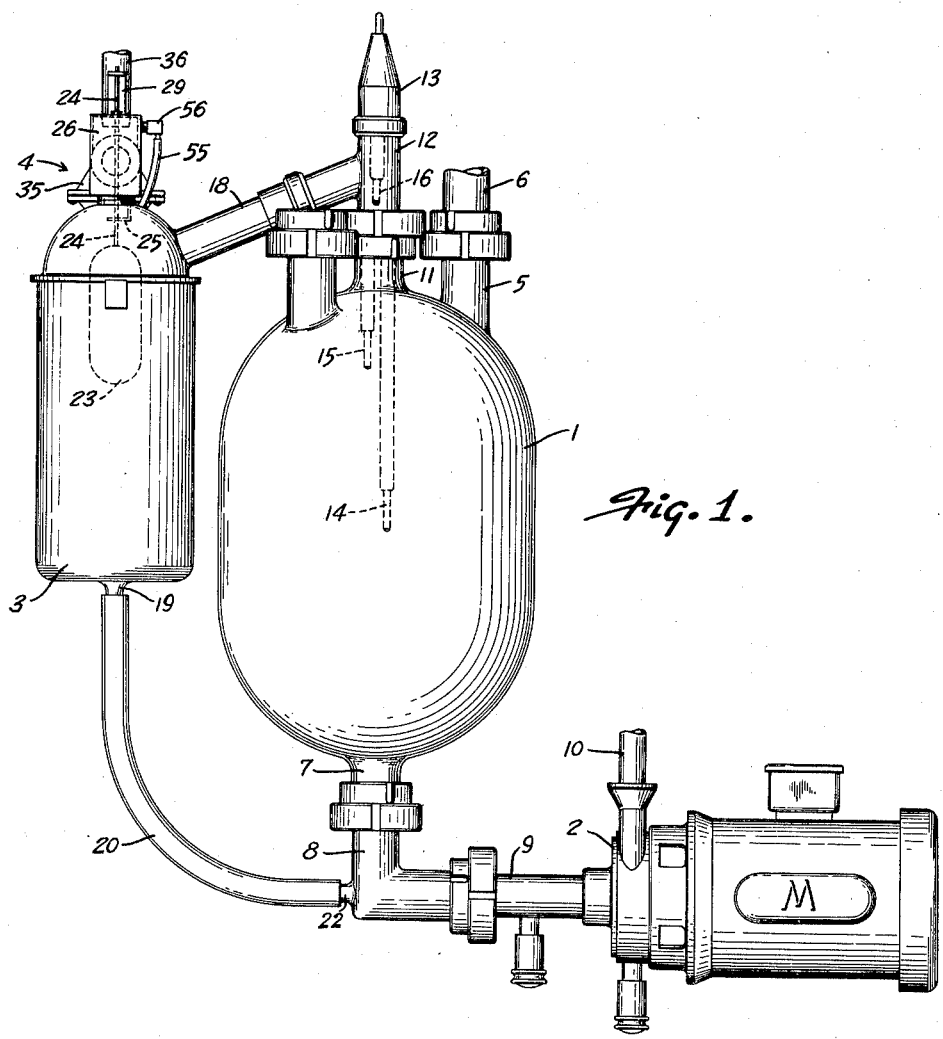
FIG. 1 is a side elevation of a portion of the pipeline milking system showing the receiving jar, pump and milk trap.
Figure 2:
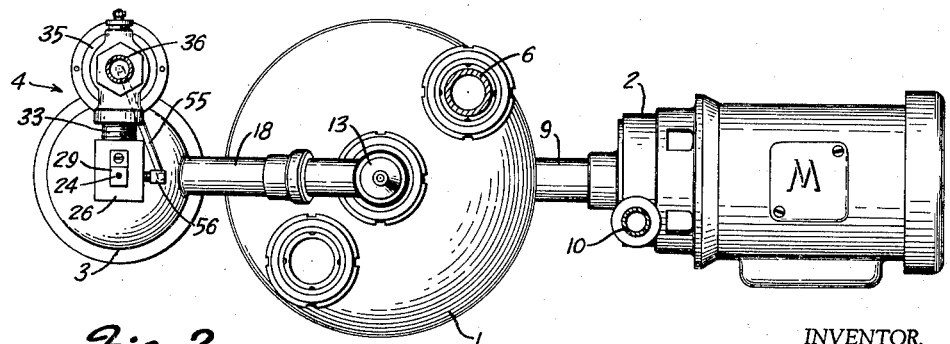
FIG. 2 is a plan view of the structure shown in FIG. 1.

The drawings illustrate a pipeline milking system which includes generally a milk-receiving jar 1, a pump 2 adapted to pump the milk from the jar 1 to a milk storage location, a milk trap 3 which communicates with the receiving jar and a vacuum control mechanism 4 associated with the vacuum line and which is adapted to close off the vacuum line when a given quantity of milk overflows into the milk trap 3.

The receiving jar 1 includes an inlet nipple 5 which is connected to pipe 6 through which milk is conducted from the milking units to the receiving jar. In addition, the jar includes a drain outlet 7 which is connected to the stem of a T fitting 8. One arm of the T fitting 8 is attached by coupling 9 to the inlet side of a pump 2 so that milk from jar 1 can be drawn into the pump. The pump outlet is connected to a pipe 10 which is adapted to conduct the milk to a bulk storage location.

The receiving jar 1 is also provided with a central overflow outlet 11 which is connected to one arm of a T fitting 12. A cap 13 is attached to the other arm of the T fitting 12 and carries a series of electrical contact probes 14, 15 and 16 which extend downwardly from the cap. The probe 14 extends downwardly to a position in the central portion of the jar 1, while the central probe 15 is located at the upper end of the jar 11. The upper probe 16 is located in the T fitting 12. The probes 14–16 are operably connected through a suitable electrical circuit to the motor of the pump 2. During the milking operation, the probes 14 and 15 are operable and are connected so that when the milk entering the jar 1 reaches the level of the middle probe 15, the pump will be actuated to withdraw the milk from the jar. When the milk level recedes beneath the level of the lower probe 14, the electrical contact will be broken and the pump will shut off.

The upper probe 16 is used during the washing cycle in conjunction with the lower probe 14. The pump then operates when the liquid level of the washing solution reaches the upper probe 16 and the pump will similarly be shut off when the liquid level recedes beneath the lower probe 14.

The stem of the T fitting 12 is connected to the inlet nipple 18 of the milk trap 3. The milk trap is also provided with a drain 19 which is adapted to be connected by a hose 20 to the arm of T fitting 8. The hose 20 is connected only during the washing cycle, and during the milking operation, the hose 20 is closed off so that there will be no flow or overflow milk from the milk trap 3 to the pump 2.

The milk trap 3 is provided with an upper central opening 21 which communicates with a suitable vacuum pump, not shown, so that vacuum will be drawn through the milk trap 3, receiving jar 1 to the milking units.

The vacuum control mechanism 4 is employed to open and close the line to the source of vacuum and includes a float 23 which is located within the milk trap 3 and is responsive to the milk level within the trap. The float 23 is carried by a vertical float rod 24 which extends through an opening in a suitable guide bracket 25 attached to the neck portion of the milk trap 3 bordering opening 21. A fitting 26 is threaded onto the neck of the milk trap bordering the opening 21 and the float rod 24 extends through the central passage 27 in the fitting and through an opening 28 to the exterior. The upper end of the float rod 24 is slidably received within an opening in a guide bracket 29 attached to the upper surface of fitting 26.

The upper end of the vertical opening 28 defines a valve seat 30 which is adapted to be closed off by a valve 31 carried by the float rod 24. In addition to the opening 28, the fitting is also provided with an air inlet passage 32 which extends from the opening 28 transversely to the exterior of the fitting.

A coupling 33 connects the passage 27 of fitting 26 with an opening or passage 34 in housing 35. A pipe or conduit 36 is connected in the opposite end of passage 34 and is adapted to be connected to a vacuum pump so that vacuum will be drawn through passage 34 and passage 27 to the milk trap 3.

The housing 35 is provided with a shoulder or step which receives an annular plastic valve seat 37 and a valve 38 is adapted to engage the seat and close off the passage 34.

Figure 3:
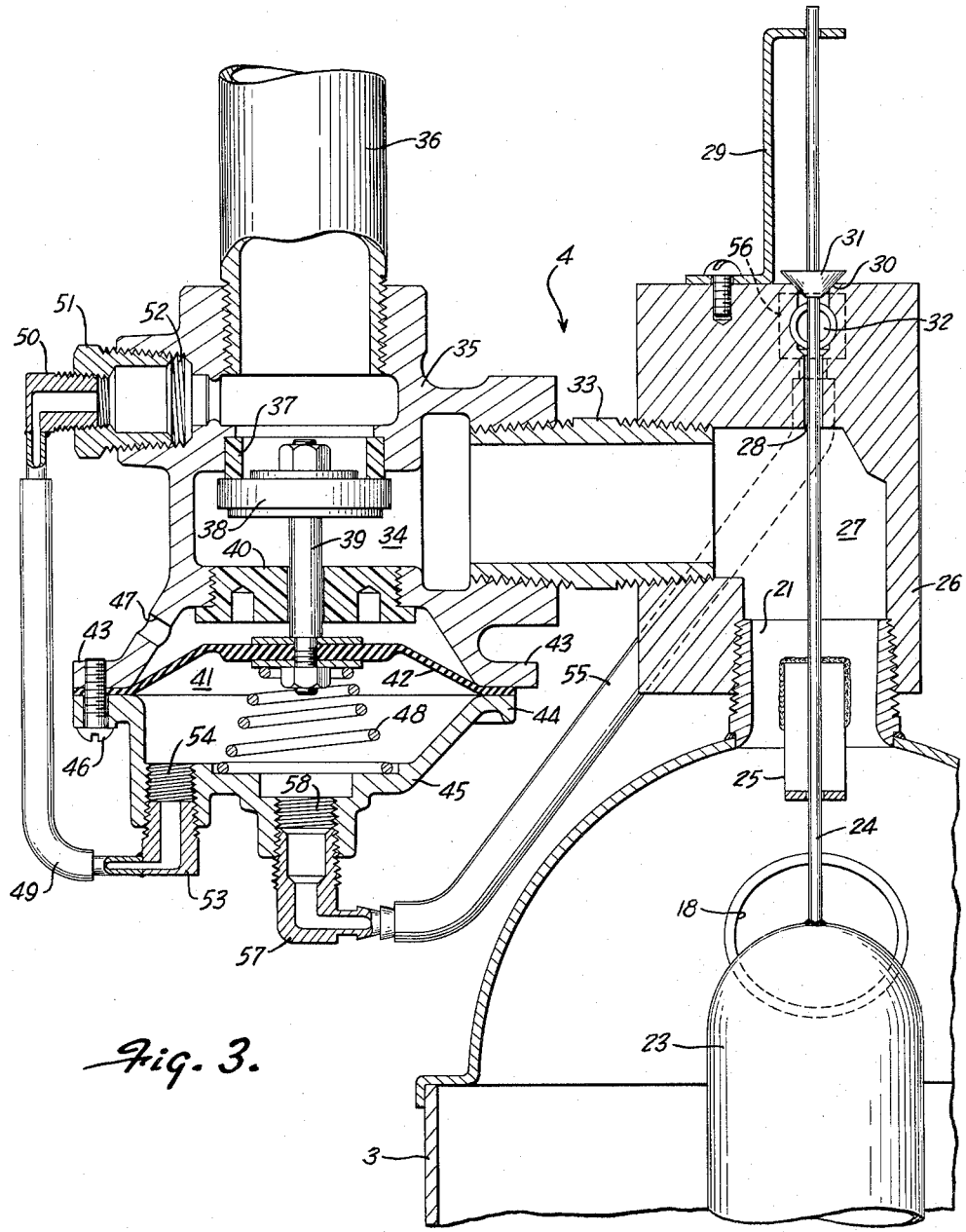
FIG. 3 is an enlarged vertical section showing the vacuum lines shutoff mechanism.

As shown in FIG. 3, the valve 38 is carried by a stem 39 which is slidably received within a guide block 40 threaded within an opening in the housing 35. The lower surface of the guide block 40 and the housing 35 define a diaphragm chamber 41, and a diaphragm 42 is secured across the chamber and is attached to the lower end of the valve stem 39. The outer periphery of the diaphragm 42 is clamped between the flange 43 of housing 35 and the flange 44 of cover 45 by bolts 46.

The upper surface of diaphragm 42 is exposed to atmospheric pressure by virtue of a vent opening 47 in the housing 35, and the diaphragm is biased upwardly to close the valve 38 by a coil spring 48 which extends between the lower surface of the diaphragm 42 and the cover 45.

During normal milking operation, the lower surface of of diaphragm 42 is exposed to a vacuum so that the atmospheric pressure acting through vent 47 will force the diaphragm 42 downwardly against the force of spring 48 to maintain the valve 38 in the open position. The lower surface of diaphragm 42 is exposed to the vacuum by means of a by-pass conduit 49. One end of conduit 49 is connected to fitting 50 which is threaded within an opening in plug 51 and the plug in turn is threaded in an opening 52 in housing 35. Opening 52 commuicates with the passage 34. The opposite end of the conduit 49 is connected by fitting 53 to an opening 54 in the cover 45. Thus, the vacuum within the passage 34 is also drawn through conduit 49 to the lower side of diaphragm 42 so that the diaphragm normally will maintain the valve 38 in the open position.

In order to move the valve 38 to the closed position when the float 23 rises within the milk trap 3, a conduit 55 is connected through fitting 56 to the air passage 32. The opposite end of the conduit 55 is connected through fitting 57 to an opening 58 in the cover 45. As previously mentioned, the float valve 31 is normally in the closed position so that no air can enter the air passage 32. However, when the float 23 rises, the valve 31 will be unseated to permit air to enter the passage 28 and passage 32 and pass through conduit 55 to the diaphragm chamber 41. The air conduit 55 being of substantially greater diameter than the vacuum conduit 49 will enable more air to bleed into the diaphragm chamber than can be removed through the vacuum line 49 with the result that the pressure will be increased beneath the diaphragm and the force of the spring will move the diaphragm upwardly and close the valve 38 in the vacuum line.

During the milking cycle the hose 20 leading from the bottom of the milk trap 3 is closed off and vacuum is drawn through the conduit 36, passage 34, milk trap 3 and receiver jar 1. The milk enters the receiver jar through pipe 6 and under normal operations when the level of milk reaches the middle probe 15, the pump is actuated to pump the milk from the receiving jar. In the event of malfunction of the pump or if an excessive quantity of air is mixed with the milk, the milk may overflow from the receiver jar 1 through T fitting 12 into the milk trap. As the level of milk in milk trap 3 rises, the float 23 will rise to open the valve 31 and thereby admit air through passage 32 and conduit 55 to flex the diaphragm upwardly and close the valve 38 in the vacuum line. The valve 38 which closes off the vacuum line is located at a remote location with respect to the float 23 so that if the quantity of milk entering the milk trap 3 is large, causing the float to bounce or be temporarily submerged, and any milk droplets resulting from splashing will not be drawn into the vacuum line.

During the washing cycle, the hose 20 is connected to the arm 22 of T fitting 8 and the upper and lower probes 14 and 16 are put into the circuit to operate the pump. Vacuum is again applied through the passage 33, milk trap 3 and receiver jar 1 to draw the washing solution into the receiver jar 1 and milk trap 3. As the level of the washing solution rises in trap 3, the float 23 will rise and open air bleed valve 31 to admit air to the diaphragm chamber and thereby close vacuum line valve 38. When the level of washing solution reaches the level of the upper probe 16 in fitting 12, the pump will start to withdraw the washing solution from the receiver jar 1. As the hose 20 is connected to the T fitting 8, the wash solution in the milk trap will also be withdrawn causing the float 23 to be lowered to thereby open the vacuum line valve 38, and restart the washing cycle.

The present invention provides a simple and yet positive mechanism for closing the vacuum line in the event a given quantity of liquid enters the milk trap. As the valve and valve actuating mechanism are located a substantial distance from the float which is responsive to the level of milk in the milk trap, no milk droplets will be drawn through the vacuum line to the vacuum pump. This eliminates the possibility of milk accumulating within the vacuum pump. While the vacuum line itself is not part of the sanitary system, it is possible for milk accumulating within the vacuum line to promote bacteria growth which can migrate to the santiary milking system.

Various modes of carrying out the invention are contemplated as being within the scope of the following claims particularly pointing out and distinctly claiming the subject matter which is regarded as the invention.

I claim:

1. In a pipe line milking system, means defining a milk chamber, conduit means providing communication between the chamber and a source of vacuum, a valve member disposed in said conduit means, fluid pressure responsive means operably connected to the valve member, means for applying said vacuum to said pressure responsive means to move said pressure responsive means in a first direction to open the valve member, means for applying atmospheric pressure to said pressure responsive means to move said pressure responsive means in a second direction to close the valve member, and means responsive to a predetermined maximum level of milk in said chamber for activating said last named means and closing the valve member.

2. In a pipe line milking system, means defining a milk chamber, conduit means providing communication between the chamber and a source of vacuum, a valve member disposed in said conduit means, fluid pressure responsive means operably connected to the valve member for opening and closing the valve member, second conduit means providing communication between said first conduit means and said pressure responsive member to thereby subject said member to the source of vacuum, third conduit means providing communication between the atmosphere and said pressure responsive member to thereby subject said member to the pressure of the atmosphere, and float valve means responsive to the level of milk in said chamber for opening said third conduit means when the level of milk rises to a predetermined level in said chamber to thereby subject said member to the atmospheric pressure and close said valve member.

3. In a pipe line milking system, a receiving container to receive milk, milk trap means including a chamber communicating with the milk receiving container and adapted to receive overflow milk from said container, conduit means connecting said chamber to a source of vacuum for establishing a vacuum in said milk trap means and said milk receiving container, valve means for opening and closing said conduit means, pressure responsive means operably connected to said valve means for actuating said valve means, second conduit means providing communication between a surface of said pressure responsive member and the atmosphere, second valve means to open and close said second conduit means, and float means responsive to the level of milk in said chamber and operably connected to said second valve member for opening the second valve means when the milk reaches a given level to thereby admit air through said second conduit means to flex said pressure responsive member and move said first valve means to the closed position to tional area of the third conduit means is substantially shut off the supply of vacuum.

4. The structure of claim 2 in which the cross sec- greater than the cross sectional area of the second conduit means.

5. In a pipeline milking system, a receiving container having an inlet to receive milk and having an outlet to discharge milk, milk trap means including a chamber adapted to receive overflow milk from said container, conduit means connecting the upper end of the receiving container with said chamber, a pump connected to the outlet of the container, a series of electrical contacts with a first and a second of said contacts being located in the container with the first contact being at a lower level than the second contact, and a third of said contacts being located in said conduit means, said contacts being operably connected to said pump with said first and second contacts being operable during the milking operation and said first and third contacts being operable during the washing operation, second conduit means connecting a source of vacuum with said chamber, valve means connected in said second conduit and located out of said milk trap means, and means responsive to the level of milk in said chamber for closing said valve means to shut off the vacuum line when the milk rises to a predetermined level in said chamber.

6. In a pipeline milking system, a receiving jar having an inlet to receive milk and having an outlet to discharge milk, a milk trap communicating with the jar and adapted to receive overflow milk from said jar, first conduit means connecting the upper end of the jar with the milk trap, a pump, drain means interconnecting the outlet of the jar with the pump, second drain means interconecting the lower end of the milk trap with the pump, a series of electrical contacts operably connected to said pump, a first and a second of said contacts being located in the jar with the first contact being at a lower level than the second contact and a third of said contacts being located in said first conduit means, said first and second contacts being operably connected to the pump during the milking system and said first and third contacts being operably connected to the pump during the washing cycle, second conduit means connecting the milk trap with a source of vacuum, valve means in said second conduit means and located out of the milk trap, and float means responsive to the level of milk in said milk trap and operably connected to the valve means for closing the valve means when the milk has risen to a predetermined level in said milk trap.

7. In a pipeline milking system, a milk trap, conduit means providing communication between the milk trap and a source of vacuum, a valve member disposed in said conduit means, a diaphragm operably connected to the valve member, means for subjecting a surface of the diaphragm to a first pressure to urge the valve to the open position, means for selectively subjecting a surface of the diaphragm to a second pressure greater than said first pressure to urge the valve to the closed position, and means responsive to a predetermined level of milk in said milk trap for actuating said last named means to thereby subject the surface of the diaphragm to said second pressure and close the valve in said first conduit means.

8. In a pipeline milking system, a milk trap, conduit means providing communication between the milk trap and a source of vacuum, a valve member disposed in said conduit means, a housing, a diaphragm disposed within the housing and operably connected to the valve member, said diaphragm dividing the housing into a first and second chamber, means for supplying atmospheric pressure to the first chamber, second conduit means connecting a source of vacuum with said second chamber, third conduit means connecting the second chamber with the atmosphere, said third conduit means having a substantially larger cross sectional area than said second conduit means, a second valve member disposed in said third conduit means, and float means responsive to the level of milk in the milk trap for opening said second valve member when the level in the milk trap rises to a predetermined level.

9. The structure of claim 8, and including resilient means for urging the first valve member to the closed position and the vacuum in said second conduit means acting against the force of said resilient means to hold the first valve member in the open position.

References Cited by the Examiner
UNITED STATES PATENTS

| | | | |
|---|---|---|---|
| 1,972,144 | 9/34 | Hapgood | 137—205 XR |
| 2,459,527 | 1/49 | Herbert | 251—61 |
| 2,625,133 | 1/53 | Hein | 119—14.07 |
| 2,664,911 | 1/54 | Thompson et al. | 137—205 |
| 2,786,445 | 3/57 | Golay | 119—14.07 |
| 2,865,391 | 12/58 | Duncan | 137—205 |
| 2,871,821 | 2/59 | Golay | 119—14.07 |
| 3,091,252 | 5/63 | Jones | 137—392 |

WILLIAM F. O'DEA, *Primary Examiner.*

LA VERNE D. GEIGER, *Examiner.*

UNITED STATES PATENT OFFICE
CERTIFICATE OF CORRECTION

Patent No. 3,211,171                       October 12, 1965

Clifford J. Kinsey

It is hereby certified that error appears in the above numbered patent requiring correction and that the said Letters Patent should read as corrected below.

Column 5, line 39, strike out "tional area of the third conduit means is substantially" and insert the same before "greater" in line 42, same column 5.

Signed and sealed this 26th day of April 1966.

(SEAL)
Attest:

ERNEST W. SWIDER
Attesting Officer

EDWARD J. BRENNER
Commissioner of Patents